US012649430B2

(12) United States Patent　(10) Patent No.:　US 12,649,430 B2

Dudar　(45) Date of Patent:　Jun. 9, 2026

(54) SYSTEMS AND METHODS FOR PREVENTING DOOR DINGS

(71) Applicant: Ford Global Technologies, LLC, Dearborn, MI (US)

(72) Inventor: Aed M. Dudar, Canton, MI (US)

( * ) Notice: Subject to any disclaimer, the term of this patent is extended or adjusted under 35 U.S.C. 154(b) by 282 days.

(21) Appl. No.: 18/438,379

(22) Filed: Feb. 9, 2024

(65) Prior Publication Data

US 2025/0256665 A1　Aug. 14, 2025

(51) Int. Cl.
B60R 3/02　(2006.01)
B60R 3/00　(2006.01)
B60R 16/03　(2006.01)

(52) U.S. Cl.
CPC .............. B60R 16/03 (2013.01); B60R 3/002 (2013.01); B60R 3/02 (2013.01)

(58) Field of Classification Search
CPC ..... B60R 16/03; B60R 16/0232; B60R 3/002; B60R 3/02; B60G 17/017; B60G 17/018
See application file for complete search history.

(56) References Cited

U.S. PATENT DOCUMENTS

| | | | |
|---|---|---|---|
| 7,070,194 B2 * | 7/2006 | Garland | .................. B60R 3/002 280/166 |
| 9,994,168 B1 | 6/2018 | Jensen et al. | |

| | | | |
|---|---|---|---|
| 10,336,260 B1 * | 7/2019 | Salter | ........................ B60R 3/02 |
| 11,781,369 B2 * | 10/2023 | Salter | ...................... E05F 15/75 49/31 |
| 11,807,190 B2 * | 11/2023 | Smith | ....................... B60R 3/02 |
| 2010/0194070 A1 | 8/2010 | Stauffer et al. | |
| 2021/0253029 A1 | 8/2021 | Berger et al. | |
| 2022/0274529 A1 | 9/2022 | Smith | |
| 2024/0399962 A1 * | 12/2024 | Wang | ....................... B60R 3/02 |

FOREIGN PATENT DOCUMENTS

| | | | | |
|---|---|---|---|---|
| CN | 112031589 A | * | 12/2020 | ........... B60N 2/0025 |
| WO | 2003066380 A1 | | 8/2003 | |

OTHER PUBLICATIONS

RealTruck, Realtruck AMP Research Powerstep, https://realtruck.com/p/amp-research-power-step/, 2023, pp. 1-8.

* cited by examiner

*Primary Examiner* — John D Walters

(74) *Attorney, Agent, or Firm* — Frank Lollo; Eversheds Sutherland (US) LLP

(57)　　　ABSTRACT

A first vehicle including a detection unit, a transceiver and a processor is disclosed. The detection unit may be configured to detect a distance between the first vehicle and a second vehicle located adjacent to the first vehicle. The transceiver may be configured to receive a second vehicle door dimension. The processor may be configured to compare the distance with the second vehicle door dimension, and determine that the second vehicle door dimension may be greater than the distance. Responsive to determining that the second vehicle door dimension may be greater than the distance, the processor may control an operation of a first vehicle component.

20 Claims, 6 Drawing Sheets

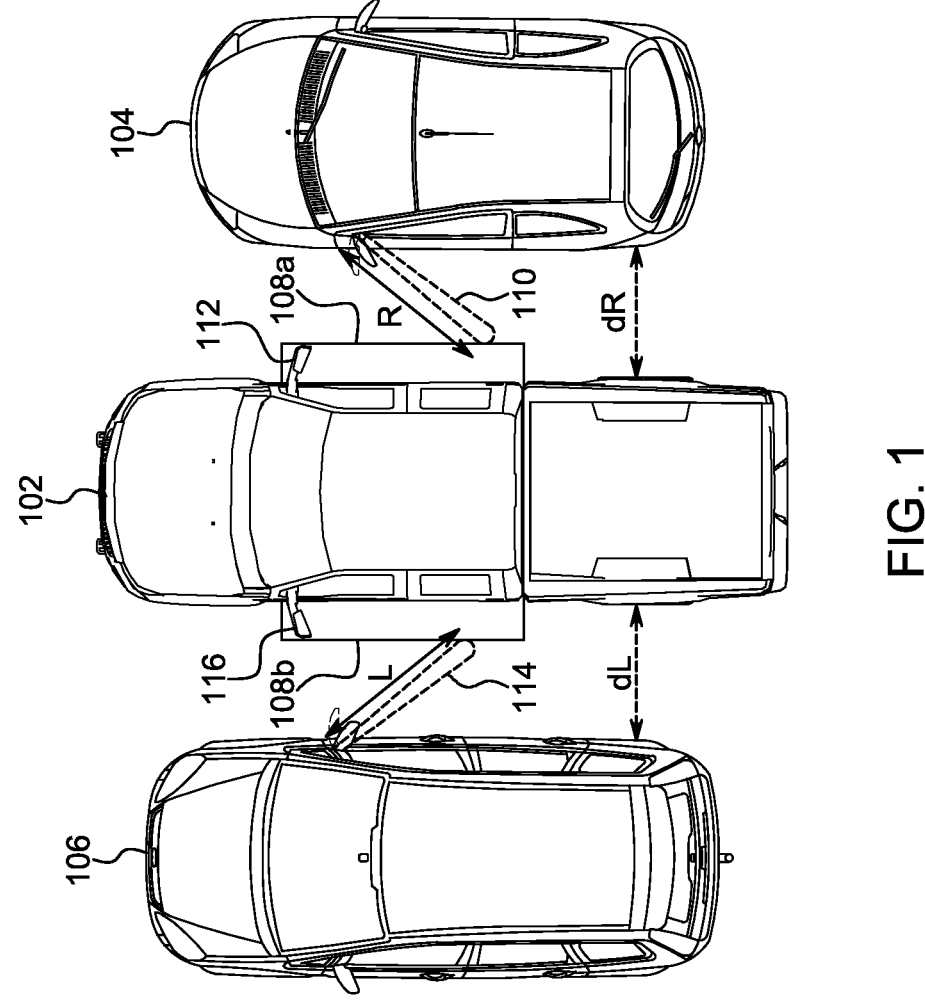
FIG. 1

602 — Start

604 — Compare a distance between first and second vehicles with a second vehicle door dimension 606 — Determine that the second vehicle door dimension is greater than the distance 608 — Control an operation of a first vehicle operation 610 — Stop

SYSTEMS AND METHODS FOR PREVENTING DOOR DINGS

FIELD

The present disclosure relates to systems and methods for preventing door dings in parked vehicles using vehicle running boards.

BACKGROUND

There are known instances of parked vehicles getting door dents or dings when doors of adjacent vehicles contact the parked vehicle's body. Door dings are particularly challenging to repair when an operator of an adjacent vehicle opens the vehicle door by force, thereby causing considerable dent to the parked vehicle's body. Such instances may cause inconvenience to the operator or users associated with the parked vehicle. Currently, there are limited means to prevent door dings from occurring, when the vehicle may be located in a parking lot with multiple vehicles parked adjacent to each other.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1 depicts an example environment in which techniques and structures for providing the systems and methods disclosed herein may be implemented.

DETAILED DESCRIPTION

Overview

Figure 2:
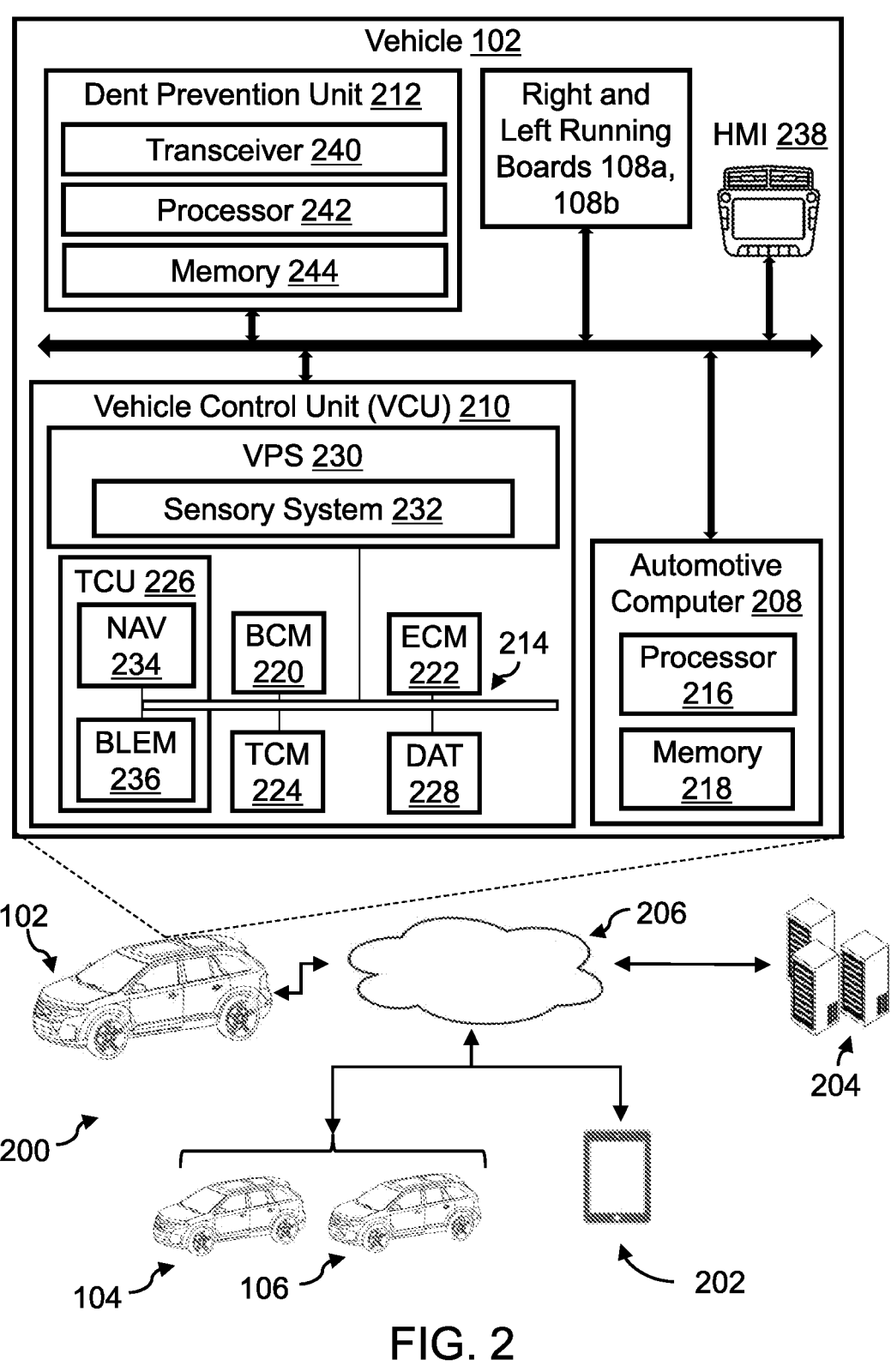
FIG. 2 depicts a block diagram of an example system for preventing door dings in accordance with the present disclosure.

The present disclosure describes a vehicle (e.g., a first vehicle) configured to prevent door dings/dents by shielding the vehicle's doors/body by using vehicle's running boards. The running boards may be configured to move between a retracted position and an extended position. The running boards may shield the vehicle's doors/body from opening doors of other vehicles (e.g., a second vehicle) parked adjacent to the first vehicle, when the running boards may be disposed in the extended position. In some aspects, when a door associated with the second vehicle may be opening, the opening door may contact the first vehicle's running board instead of contacting the first vehicle's doors/body, thereby preventing the first vehicle from getting dents.

In some aspects, the first vehicle may be configured to determine a distance between the adjacent sides of the first vehicle and the second vehicle, when the second vehicle may be parked adjacent to the first vehicle. The first vehicle may determine the distance by using inputs obtained from one or more sensors installed in the first vehicle. The first vehicle may further obtain dimensions/length of the door associated with the second vehicle (or "second vehicle door") from the second vehicle. In some embodiments, the door dimensions of the second vehicle may further be determined by a process that includes, but is not limited to, use of an image captured by camera or other imaging system. Responsive to determining the distance and obtaining the second vehicle door length, the first vehicle may compare the distance with the second vehicle door length.

The first vehicle may cause the running board on the first vehicle side facing the second vehicle to move to the extended position, when the second vehicle door length may be greater than the distance between the adjacent sides of the first and second vehicles. Stated another way, the first vehicle may cause the running board to move to the extended position when a probability of the second vehicle door contacting the first vehicle body/doors may be high (e.g., during the second vehicle door opening operation). In this manner, the first vehicle prevents its body from getting dents from the opening second vehicle door.

On the other hand, the first vehicle may keep the running board in the retracted position when the second vehicle door length may be less than the distance between the adjacent sides of the first and second vehicles.

The first vehicle may be further configured to adjust the first vehicle height relative to the second vehicle height, so that both the first and second vehicles may be at equivalent heights when the first and second vehicles may be parked adjacent to each other. If the first vehicle is not configured to adjust the first vehicle height to be equivalent to the second vehicle height, the first vehicle may transmit a height adjustment notification to the second vehicle, causing the second vehicle to adjust the second vehicle height to be equivalent to the first vehicle height.

When the second vehicle door may be opening, the first vehicle may increase the first vehicle height to be greater than the second vehicle height, thereby enabling the running board associated with the first vehicle to efficiently shield the first vehicle body from the opening second vehicle door. In a similar manner, when the first vehicle door may be opening, the second vehicle may increase the second vehicle height, so that a running board associated with the second vehicle may efficiently shield the second vehicle body from the opening first vehicle door.

The present disclosure discloses a vehicle that uses the vehicle's running boards to shield its body from getting dents due to the opening doors of adjacent vehicles. The vehicle does not use external devices or structures, and instead uses in-built vehicle components to shield its body from dents. Further, the vehicle moves the running boards to the extended position (fully or partially) only when the adjacent vehicle is parked close to the vehicle and not otherwise, thereby ensuring that the running boards are not unnecessarily obstructing passage between parked vehicles.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 (or a "first vehicle") that may be located in a parking lot or a geographical area where a plurality of vehicles may be parked/located in proximity to each other. In the exemplary aspect depicted in FIG. 1, the vehicle 102 is parked between a vehicle 104 (or a "second vehicle") and a vehicle 106 (or a third vehicle). The vehicle 104 may be located/parked adjacent to the vehicle 102 and at a right side of the vehicle 102, and the vehicle 106 may be located/parked adjacent to the vehicle 102 and at a left side of the vehicle 102.

Each vehicle 102, 104, 106 may take the form of any passenger or commercial vehicle such as, for example, a car, a work vehicle, a crossover vehicle, a truck, a van, a minivan, a taxi, a bus, etc. Further, each vehicle 102, 104, 106 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

In some aspects, the vehicle 102 (and one or both of the vehicles 104, 106) may include right and left running boards 108a, 108b (collectively referred to as running boards 108) that may be disposed on right and left body sides of the vehicle 102, in proximity to a vehicle bottom portion/bed. A person ordinarily skilled in the art may appreciate that the running boards 108 are typically positioned/disposed on both the left and right sides of the vehicle 102 to provide assistance for the ingress and egress to/from a vehicle interior portion through a corresponding vehicle door (e.g., front and rear vehicle doors). Each running board 108 may include a generally planar upper surface configured to receive a vehicle operator or passenger's foot when the vehicle operator and/or the passenger may be entering the vehicle interior portion or exiting the vehicle 102, thereby enabling the vehicle operator/passenger to conveniently enter/exit into/from the vehicle 102.

In accordance with the present disclosure, each running board 108 may be configured to move between a retracted position and an extended position. In the extended position, the running board 108 may extend away from the vehicle body such that the planar upper surface of the running board 108 may be perpendicular to the vehicle height, thereby enabling the vehicle operator and/or the passenger to conveniently place the foot on the planar upper surface (to enter or exit into/from the vehicle 102). On the other hand, in the retracted position, the running board 108 may not extend away from the vehicle body and may instead be tucked in or under the vehicle bottom portion/bed.

In some aspects, the vehicle 102 may be configured to use the running boards 108 to prevent door dings/dents on the vehicle doors/body associated with the vehicle 102 (or "vehicle 102 body"). Specifically, the vehicle 102 may move the running boards 108 to a fully extended position or a partially extended position when the vehicle 102 may be parked between one or more adjacent vehicles (e.g., the vehicles 104, 106) to prevent doors associated with the adjacent vehicles from contacting the vehicle 102 body when the adjacent vehicle's doors may be opening. In this case, the adjacent vehicle's doors may contact the running boards 108 in the fully or partially extended position and not contact the vehicle 102 body, thereby preventing door dings on the vehicle 102.

In an exemplary aspect, the vehicle 102 may include a detection unit (or a vehicle sensory system, shown as vehicle sensory system 232 in FIG. 2) that may be configured to determine a first distance "dR" between the vehicle 102 and the vehicle 104. Specifically, the detection unit may determine the first distance "dR" between a vehicle 102 right side and a vehicle 104 left side. The vehicle 102 may further obtain a dimension or length "R" of a left vehicle door(s) 110 associated with the vehicle 104 from a server (shown as server 204 in FIG. 2) or directly from the vehicle 104. In some embodiments, the door dimension or length "R" of the second vehicle may further be determined by a process that includes, but is not limited to, use of an image captured by camera or other imaging system associated with the vehicle 102. In some aspects, the length "R" may be the vehicle door length from the vehicle body when the left vehicle door 110 may be in a fully open state.

Responsive to obtaining the length "R" and determining the first distance "dR", the vehicle 102 may compare "R" with "dR". The vehicle 102 may cause the right running board 108a to move to the fully or partially extended position when "R" may be greater than "dR". Stated another way, when the distance between the vehicles 102 and 104 may be less than the left vehicle door 110 length, the vehicle 102 may cause the right running board 108a to move to the fully or partially extended position. In the fully or partially extended position, the right running board 108a may shield the right vehicle doors/body and/or a right side rearview mirror 112 associated with the vehicle 102 from getting in contact with the left vehicle door 110, when the left vehicle door 110 may be opening. In this case, the left vehicle door 110 may contact the right running board 108a (instead of contact to the vehicle 102 right vehicle doors/body and/or the right side rearview mirror 112), thereby potentially preventing the vehicle 102 from getting any dent. Stated another way, the right running board 108a may act as a physical barrier for potential door dings on the vehicle 102 caused due to the left vehicle door 110.

On the other hand, when the vehicle 102 determines that "R" may be less than "dR" based on the comparison described above, the vehicle 102 may not cause the right running board 108a to move to the fully or partially extended position, and may instead keep the right running board 108a in the retracted position. A person ordinarily skilled in the art may appreciate that in this case, the left vehicle door 110 may not contact the vehicle 102 right vehicle doors/body and/or the right side rearview mirror 112 even when the left vehicle door 110 may be fully opened. Therefore, in this case, the vehicle 102 may keep the right running board 108a in the retracted position, to ensure that the right running board 108a does not unnecessarily obstruct passage between the vehicles 102 and 104.

In a similar manner, the detection unit may determine a second distance "dL" between the vehicles 102 and 106 (specifically between a vehicle 102 left side and a vehicle 106 right side), and the vehicle 102 may obtain a dimension or length "L" of a right vehicle door(s) 114 associated with the vehicle 106 from the server or directly from the vehicle 106. The vehicle 102 may then compare "L" with "dL", and may move the left running board 108b to the fully or partially extended position to shield the vehicle 102 left vehicle doors/body and/or a left side rearview mirror 116 when "L" may be greater than "dL", in the similar manner as described above. On the other hand, when "L" may be less than "dL", the vehicle 102 may not cause the left running board 108b to move to the fully or partially extended position.

A person ordinarily skilled in the art may appreciate from the description above that the vehicle 102 may independently move the right and left running boards 108a, 108b based on "R", "dR", "L" and "dL". Stated another way, the vehicle 102 may have both the running boards 108a, 108b extended at the same time, or may have only one running board extended at a particular time, based on "R", "dR", "L" and "dL".

In some aspects, the vehicles 104 and 106 may have running boards similar to the running boards 108, and the vehicles 104 and 106 may control movement of their respective running boards in a similar manner as described above. In further aspects, each vehicle 102, 104, 106 may be configured to adjust its vehicle height, so that its running boards in partially/fully extended positions may effectively shield the vehicle's body/doors from getting dents. The process of adjusting the vehicle height, and further vehicle details are described below in conjunction with FIGS. 2-5.

The vehicles 102, 104, 106 implement and/or perform operations, as described here in the present disclosure, in accordance with the owner manual and safety guidelines. In addition, any action taken by the vehicle operator based on recommendations or notifications provided by the vehicles 102, 104, 106 should comply with all the rules specific to the location and operation of the vehicles 102, 104, 106 (e.g., Federal, state, country, city, etc.). The recommendations or notifications, as provided by the vehicles 102, 104, 106 should be treated as suggestions and only followed according to any rules specific to the location and operation of the vehicles 102, 104, 106.

FIG. 2 depicts a block diagram of an example system 200 for preventing door dings in accordance with the present disclosure. While describing FIG. 2, references will be made to FIGS. 3, 4 and 5.

The system 200 may include the vehicle 102 (or the first vehicle), the vehicle 104 (or the second vehicle), the vehicle 106 (or the third vehicle), a user device 202, and one or more servers 204 (or server 204) communicatively coupled with each other via one or more networks 206 (or network 206). The user device 202 may be associated with the vehicle operator/user of the vehicle 102, and may be, for example, a mobile phone, a laptop, a computer, a tablet, a smartwatch, a wearable device, or any other device with communication capabilities.

The server 204 may be part of a cloud-based computing infrastructure and may be associated with and/or include a Telematics Service Delivery Network (SDN) that provides digital data services to the vehicles 102, 104, 106 and other vehicles (not shown) that may be part of a vehicle fleet. In further aspects, the server 204 may be configured to store vehicle dimensions associated with a plurality of vehicles (including the vehicles 102, 104 and 106). The vehicle dimensions may include, for example, vehicle door lengths/dimensions, vehicle height, vehicle length, and/or the like. The server 204 may be configured to transmit the vehicle dimensions to the vehicle 102, 104 or 106, when the respective vehicles transmit a request to the server 204 to obtain the vehicle dimensions of a particular vehicle.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a dent prevention unit 212 (or unit 212). The VCU 210 may include a plurality of Electronic Control Units (ECUs) 214 disposed in communication with the automotive computer 208.

In some aspects, the user device 202 may be configured to connect with the automotive computer 208 and/or the unit 212 via the network 206, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing operations in accordance with the disclosure. The memory 218 may be a non-transitory computer-readable storage medium or memory storing a dent prevention program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), the user device 202, the vehicles 104, 106, and/or the like. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a detection unit). The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sonar sensors, ultrasonic sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, etc. In some aspects, the vehicle sensory system 232 may be configured to determine the first distance "dR" between the vehicles 102 and 104, and the second distance "dL" between the vehicles 102 and 106, as described above in conjunction with FIG. 1.

In some aspects, the VCU 210 may control vehicle operational aspects and implement one or more instruction sets received from the server 204, the user device 202, the vehicles 104, 106, from one or more instruction sets stored in the memory 218, including instructions operational as part of the unit 212.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), the server 204, the user device 202, the vehicles 104, 106, etc.), computers, and modules. The TCU 226 may be disposed in communication with the ECUs 214 by way of a bus. In some aspects, the TCU 226 may be configured to determine a real-time vehicle geolocation, e.g., via the NAV receiver 234.

The ECUs 214 may control aspects of vehicle operation and communication using inputs from human drivers, inputs from the automotive computer 208, the unit 212, and/or via wireless signal inputs received via the wireless connection(s) from other connected devices, such as the server 204, the vehicles 104, 106, the user device 202, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, the right and left running boards 108a, 108b, etc. In some aspects, the BCM 220 may be configured to move the right and left running boards 108a, 108b between the retracted position and the extended position (fully or partially extended position) based on command signals received from the processor 216 and/or the unit 212. The BCM 220 may command solenoids or stepper motors associated with the running boards 108 to move them from the retracted position to the extended position, and vice-versa. The BCM 220 may also operate as a gateway for bus and network interfaces to interact with remote ECUs (not shown in FIG. 2).

As described above in conjunction with FIG. 1, the right and left running boards 108a, 108b may be configured to move between a retracted position and an extended position (e.g., a fully extended or a partially extended position). In some aspects, the right running board 108a may extend away from a right side body of the vehicle 102, shielding the vehicle's right side body/doors and/or the right side rearview mirror 112 from door dents/dings or preventing the left vehicle door 110 from contacting the vehicle 102 body, when the right running board 108a may be in the extended position (partially or fully). In this case (i.e., in the extended position), the left vehicle door 110 may contact the right running board 108a (instead of contacting the vehicle 102 body and/or the right side rearview mirror 112) when the left vehicle door 110 may open, thereby preventing the vehicle 102 from getting dents. On the other hand, the right running board 108a may not extend away from the right side body of the vehicle 102 when the right running board 108a may be in the retracted position.

In a similar manner, the left running board 108b may extend away from a left side body of the vehicle 102, shielding the vehicle's left side body/doors and/or the left side rearview mirror 116 from door dents/dings or preventing the right vehicle door 114 from contacting the vehicle 102 body, when the left running board 108b may be in the extended position (partially or fully). In this case (i.e., in the extended position), the right vehicle door 114 may contact the left running board 108b (instead of contacting the vehicle 102 body and/or the left side rearview mirror 116) when the right vehicle door 114 may open, thereby preventing the vehicle 102 from getting dents. On the other hand, the left running board 108b may not extend away from the left side body of the vehicle 102 when the left running board 108b may be in the retracted position.

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system or a vehicle Human-Machine Interface (HMI) 238. The HMI 238 may include a touchscreen interface portion, and may include voice recognition features, biometric identification capabilities that may identify users based on facial recognition, voice recognition, fingerprint identification, or other biological identification means. In other aspects, the HMI 238 may be further configured to receive user instructions via the touchscreen interface portion, and/or output or display notifications, recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 240, a processor 242, and a computer-readable memory 244.

The transceiver 240 may be configured to receive information/inputs from one or more external devices or systems, e.g., the user device 202, the server 204, the vehicles 104, 106, and/or the like, via the network 206, vehicle-to-vehicle (V2V) communication and/or vehicle-to-infrastructure (V2I) communication. Further, the transceiver 240 may transmit notifications, requests, signals, etc. to the external devices or systems. In addition, the transceiver 240 may be configured to receive information/inputs from vehicle components such as the vehicle sensory system 232, one or more ECUs 214, and/or the like. Further, the transceiver 240 may transmit signals (e.g., command signals) or notifications to the vehicle components such as the BCM 220, the HMI 238, and/or the like.

The processor 242 and the memory 244 may be same as or similar to the processor 216 and the memory 218, respectively. In some aspects, the processor 242 may utilize the memory 244 to store programs in code and/or to store data for performing operations in accordance with the disclosure. The memory 244 may be a non-transitory computer-readable storage medium or memory storing the dent prevention program code. In some aspects, the memory 244 may additionally store instructions/information/data (e.g., vehicle dimensions) obtained from the server 204, the user device 202, the vehicles 104, 106, and/or the like. The memory 244 may further store vehicle dimensions (e.g., vehicle door dimensions/length, vehicle height, etc.) associated with the vehicle 102.

In operation, the transceiver 240 may receive the vehicle dimensions (vehicle door length/dimensions, vehicle height, and/or the like) associated with the vehicles 104 and/or 106, when the vehicles 104 and/or 106 may be located/parked adjacent to the vehicle 102. In some aspects, the transceiver 240 may receive the vehicle dimensions described above from the server 204 via the network 206. In other aspects, the transceiver 240 may receive the vehicle dimensions described above from the respective vehicles 104 and/or 106 via the network 206, V2V communication or V2I communication. The transceiver 240 may transmit the received vehicle dimensions to the processor 242 and/or the memory 244 for storage purpose.

The processor 242 may obtain the vehicle dimensions from the transceiver 240. Responsive to obtaining the vehicle dimensions, the processor 242 may obtain inputs from the vehicle sensory system 232 to determine the first distance "dR" and/or the second distance "dL" (depending on whether one or both of the vehicles 104 and 106 are parked adjacent to the vehicle 102) based on the obtained inputs. The processor 242 may further compare the first distance "dR" with the length "R" of the left vehicle door 110 (if the vehicle 104 may be parked adjacent to the vehicle 102), and/or the second distance "dL" with the length "L" of the right vehicle door 114 (if the vehicle 106 may be parked adjacent to the vehicle 102).

Figure 3:
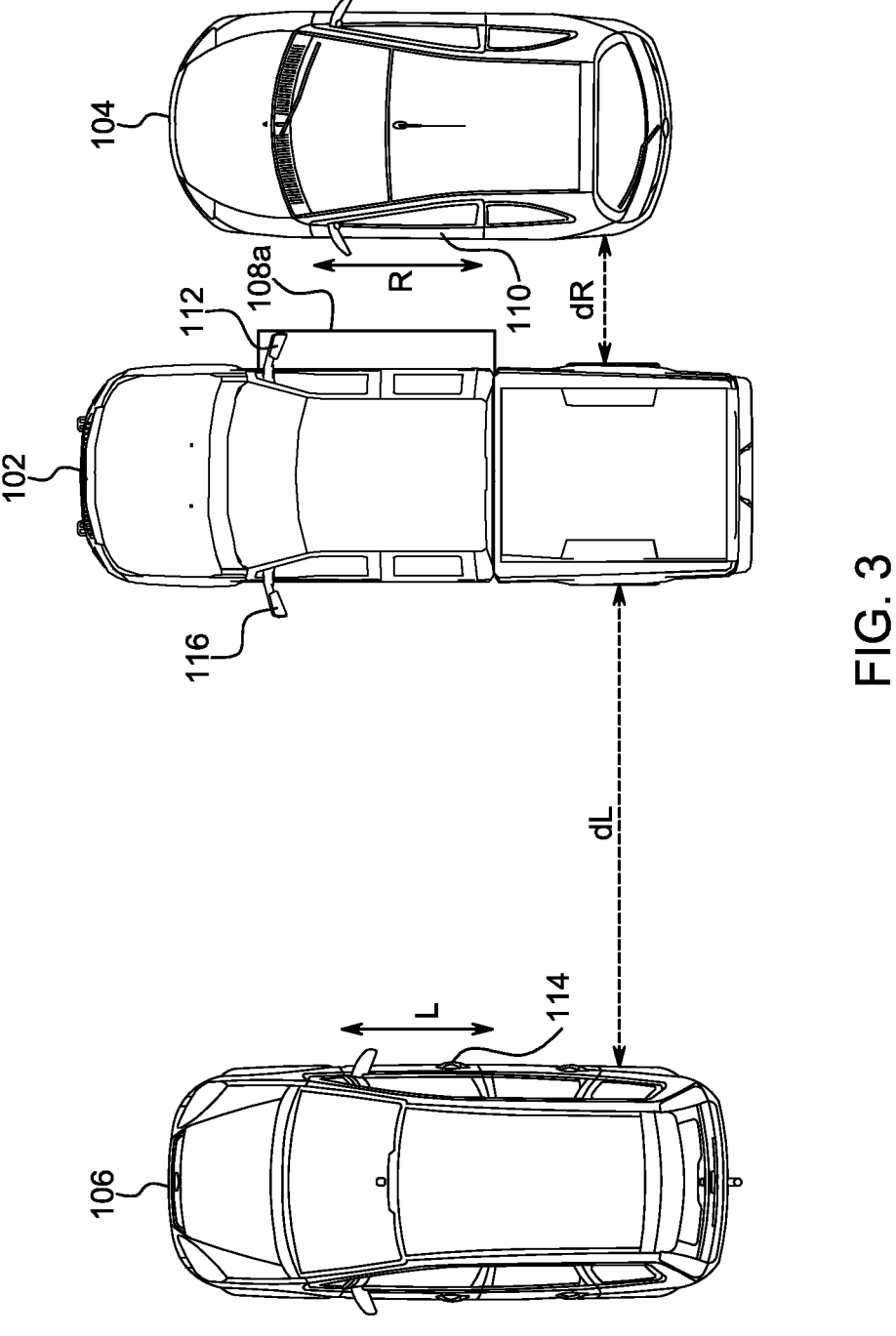
FIG. 3 depicts an example snapshot of a vehicle right running board in an extended position in accordance with the present disclosure.

Based on the comparison described above, in one exemplary aspect, the processor 242 may determine that the length "R" may be greater than the first distance "dR", and the length "L" may be less than the second distance "dL". Responsive to such determination, the processor 242 may control operations of the right running board 108a (e.g., a "first vehicle component") and the left running board 108b (e.g., a "second vehicle component). Specifically, in this case, the processor 242 may transmit a command signal to the BCM 220 to cause the right running board 108a to move to the extended position (fully or partially extended position), and keep the left running board 108b in the retracted position, as shown in FIG. 3.

In some aspects, the processor 242 may cause the right running board 108a to extend just enough (or move to a partially extended position, and not to a fully extended position) so that the right running board 108a effectively shields the vehicle 102 right doors/body and/or the right side rearview mirror 112 (if the right side rearview mirror 112 is not configured to be auto-folded) from the opening left vehicle door 110, without causing considerable obstruction in the passage between the vehicles 102 and 104. In this manner, in the partially extended position, the right running board 108a allows better access to shopping carts and/or walkers between the vehicles 102 and 104, while shielding the vehicle 102 from door dings at the same time.

Figure 4:
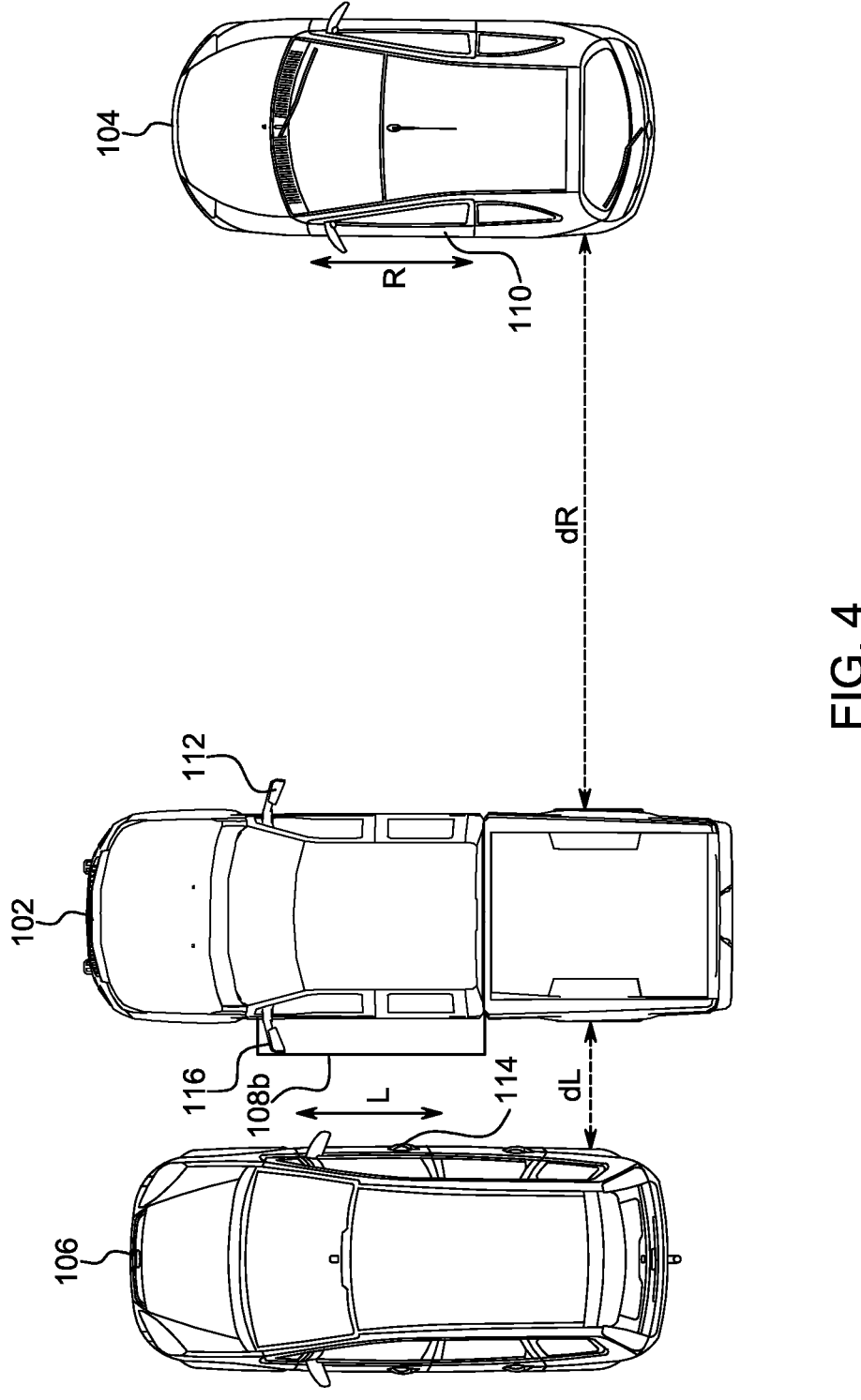
FIG. 4 depicts an example snapshot of a vehicle left running board in an extended position in accordance with the present disclosure.

In a second exemplary aspect, the processor 242 may determine that the length "L" may be greater than the second distance "dL", and the length "R" may be less than the first distance "dR". Responsive to such determination, the processor 242 may control operations of the right running board 108a and the left running board 108b, by causing (via the BCM 220) the left running board 108b to move to the extended position (fully or partially extended position), and keeping the right running board 108a in the retracted position, as shown in FIG. 4. In this arrangement, the left running board 108b may shield the vehicle 102 left doors/body and/or the left side rearview mirror 116 from the opening right vehicle door 114.

In a third exemplary aspect, the processor 242 may determine that the length "L" may be greater than the second distance "dL", and the length "R" may also be greater than the first distance "dR". Responsive to such determination, the processor 242 may cause both the right and left running boards 108a, 108b to move to the extended position (fully or partially extended position) to shield both sides of the vehicle 102, as shown in FIG. 1.

In a fourth exemplary aspect (not shown), the processor 242 may determine that the length "L" may be less than the second distance "dL", and the length "R" may also be less than the first distance "dR". Responsive to such determination, the processor 242 may keep both the right and left running boards 108a, 108b in retracted positions.

In further aspects, the processor 242 may fetch the vehicle dimensions associated with the vehicle 102 from the memory 244, and may transmit (via the transceiver 240) the fetched vehicle dimensions to the vehicles 104 and/or 106, so that the vehicles 104 and/or 106 may perform similar operations (e.g., move their respective running boards to the extended positions) as described above.

The processor 242 may be further configured to compare the first distance "dR" and/or the second distance "dL" with door dimensions/length associated with vehicle doors of the vehicle 102. Responsive to determining that the door length associated with the vehicle 102 doors may be greater than the first distance "dR" and/or the second distance "dL" based on the comparison, the processor 242 may transmit (via the transceiver 240) an alert notification to the HMI 238, the user device 202 and/or the vehicles 104, 106, indicating that the vehicle 102 door length may be greater than the first distance "dR" and/or the second distance "dL". Responsive to hearing/viewing such an alert notification, a vehicle user associated with the vehicle 102 may exercise caution while opening the vehicle 102 doors. Furthermore, responsive to hearing/viewing such an alert notification, the operators associated with the vehicles 104 and/or 106 may decide to move their vehicles to some other parking location, or the vehicles 104, 106 may move their respective running boards to the extended position.

Figure 5:
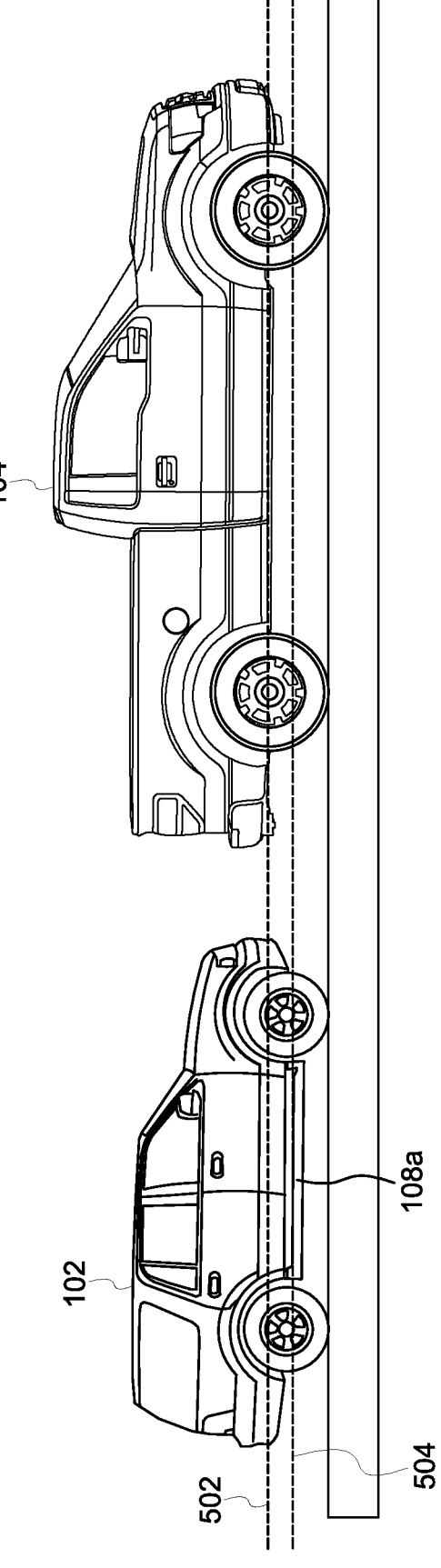
FIG. 5 depicts an example snapshot of two vehicles of different heights in accordance with the present disclosure.

In additional aspects, the processor 242 may adjust the vehicle 102 height based on the vehicle 104 height (and/or the vehicle 106 height), to ensure that the vehicle 102 is effectively shielded from door dings caused due to the vehicle 104 doors. A person ordinarily skilled in the art may appreciate that if the vehicle 104 height is greater than the vehicle 102 height (as shown in FIG. 5), the doors associated with the vehicle 104 may still contact the vehicle 102 body/doors causing door dings even when the right running board 108a may be in the extended position. For example, as shown in FIG. 5, since the bottom portions of the vehicle 104 doors (shown as a line segment 502) are above the plane of the right running board 108a (shown as a line segment 504) due to the greater vehicle 104 height as compared to the vehicle 102 height, the doors associated with the vehicle 104 may still contact the vehicle 102 body/doors causing door dings, irrespective of the positional status of the right running board 108a. To mitigate such a scenario and to ensure that the right running board 108a effectively shields the vehicle 102 from door dings, the processor 242 may adjust the vehicle 102 height, as described below.

In some aspects, the processor 242 may first determine/obtain the vehicle 102 height from the memory 244, and the vehicle 104 height from the vehicle 104 and/or the server 204. In this case, the transceiver 240 may receive the vehicle 104 height from the vehicle 104 and/or the server 204, and the processor 242 may obtain the vehicle 104 height from the transceiver 240.

Responsive to determining/obtaining the vehicle 102 height and the vehicle 104 height, the processor 242 may compare the vehicle 102 height with the vehicle 104 height, and determine that the vehicle 102 height may be less than the vehicle 104 height based on the comparison. Responsive to such determination, the processor 242 may control, via the BCM 220, a vehicle suspension operation of the vehicle 102 to increase the vehicle 102 height to be equivalent to the vehicle 104 height. In this manner, the processor 242 adjust the vehicle 102 height to be equivalent to the vehicle 104 height, thereby enabling the right running board 108a to effectively shield the vehicle 102 from door dings.

In a scenario where the processor 242 determines that the vehicle 102 height is not configured or capable to be equivalent to the vehicle 104 height even after elevating the vehicle 102 height to its maximum level (or if the vehicle 102 does not have active vehicle suspension), the processor 242 may transmit (via the transceiver 240) a height adjustment notification to the vehicle 104 to lower the vehicle 104 height to be equivalent to the vehicle 102 height. Responsive to receiving the height adjustment notification from the processor 242/transceiver 240, the vehicle 104 may adjust its height, thereby ensuring that both the vehicles 102 and 104 are at equivalent heights. If the vehicles 102 and 104 are still not able to achieve equivalent heights using the methods described above, the processor 242 may transmit a request to the HMI 238 and/or the user device 202, requesting the vehicle operator to move to another parking spot where adjacent vehicles may have similar heights as the vehicle 102 height.

When the vehicle 102 and the vehicle 104 (or any other vehicle adjacent to the vehicle 102) may be at equivalent heights, the processor 242 may determine that a door associated with the vehicle 104 (specifically the vehicle 104 door facing the vehicle 102) may be opening. In some aspects, the processor 242 may determine that the vehicle 104 door may be opening based on inputs obtained from the vehicle sensory system 232 and/or directly from the vehicle 104 (e.g., via V2V or V2I communication). Responsive to such determination, the processor 242 may control, via the BCM 220, the vehicle suspension operation associated with the vehicle 102 to increase the vehicle 102 height to be greater than the vehicle 104 height. A person ordinarily skilled in the art may appreciate that when the vehicle 102 height is greater than the vehicle 104 height, the vehicle 104 door may contact the right running board 108a in the extended position, instead of contacting the vehicle 102 body/doors, thereby preventing door dings on the vehicle 102.

In a similar manner, when the vehicle 102 and the vehicle 104 (or any other vehicle adjacent to the vehicle 102) may be at equivalent heights, the processor 242 may determine that a door associated with the vehicle 102 (specifically the vehicle 102 door facing the vehicle 104) may be opening, e.g., based on inputs obtained from the VCU 210. Responsive to such determination, the processor 242 may transmit, via the transceiver 240, a height increase notification to the vehicle 104 to increase the vehicle 104 height to be greater than the vehicle 102 height, thereby enabling the running boards associated with the vehicle 104 to effectively shield the vehicle 104 body from the opening vehicle 102 door.

In some aspects, the process described above is dynamic in nature, and the processor 242 implements a similar process as described above when the vehicle 104 departs and another vehicle gets parked adjacent to the vehicle 102.

In accordance with additional aspects of the present disclosure, the processor 242 may be configured to obtain (e.g., via the transceiver 240 and V2V communication) information associated with a count of passengers that may be present in the vehicle 102 and an adjacent vehicle (e.g., the vehicle 104 and/or the vehicle 106) and an orientation of the vehicle 102 relative to the adjacent vehicle, and control the operation of the running boards 108 based on the count of passengers and the orientation. As an example, the processor 242 may not cause the running boards 108 to move to the extended positions when there may only be a driver present in the vehicle 102 and the adjacent vehicle may also only have a driver, and the vehicle 102 and the adjacent vehicle may be oriented in opposite directions (e.g., the vehicle 102 oriented towards East direction and the adjacent vehicle oriented towards West direction). In this case, the processor 242 may not cause the running boards 108 to move to the extended positions since the probability of door ding/dent may be low.

In some aspects, the processor 242 may obtain the information associated with the count of passengers from the vehicle's onboard sitting area occupancy load cells or sitting area sensors, vehicle interior cameras, and/or the like. Further, the processor 242 may obtain the vehicle's orientation information from vehicle's onboard compass.

Figure 6:
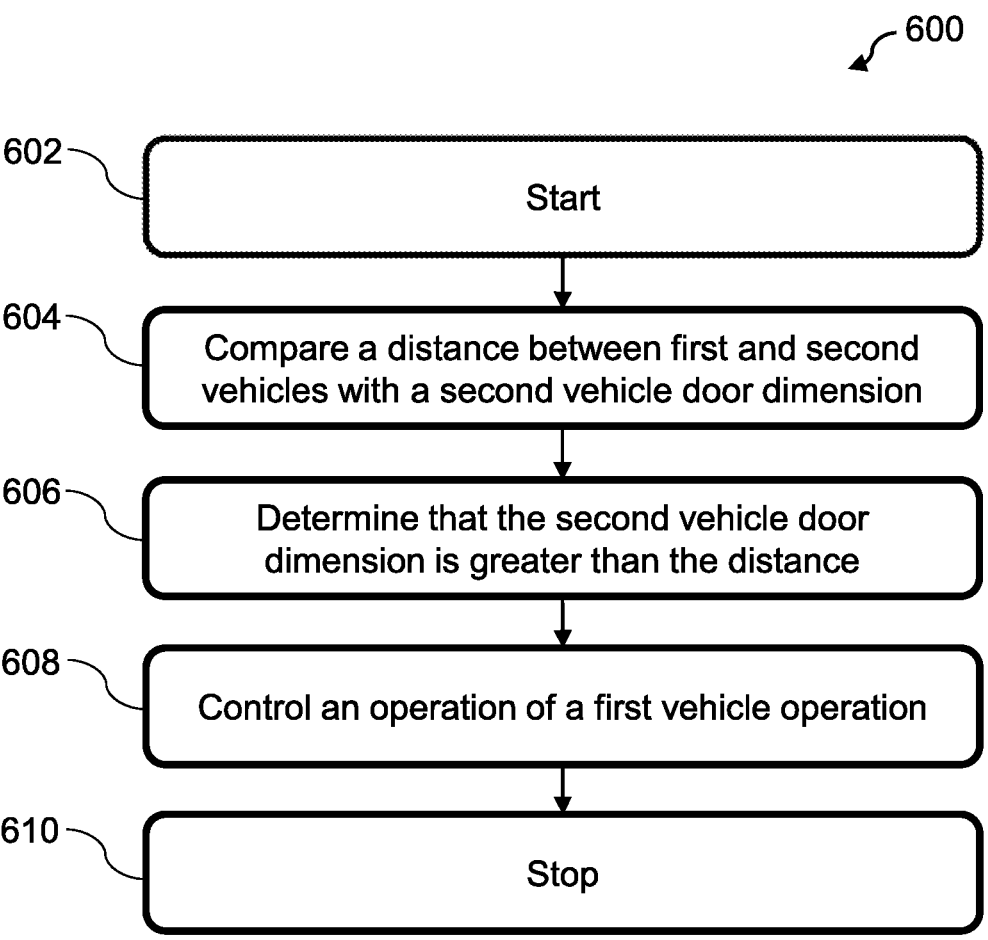
FIG. 6 depicts a flow diagram of an example method for preventing door dings in accordance with the present disclosure.

FIG. 6 depicts a flow diagram of an example method 600 for preventing door dings in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include comparing, by the processor 242, the first distance "dR" with the length "R". At step 606, the method 600 may include determining, by the processor 242, that the length "R" may be greater than the first distance "dR", based on the comparison. At step 608, the method 600 may include controlling, by the processor 242, the operation of a vehicle component associated with the vehicle 102 or the right running board 108a, responsive to determining that the length "R" may be greater than the first distance "dR". Specifically, as described above in conjunction with FIG. 2, the processor 242 may cause the right running board 108a to move to the fully or partially extended position, when the length "R" may be greater than the first distance "dR".

The method 600 may end at step 610.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle comprising:
a detection unit configured to detect a first distance between the first vehicle and a second vehicle located adjacent to the first vehicle;
a transceiver configured to receive a second vehicle door dimension; and
a processor communicatively coupled with the detection unit and the transceiver, wherein the processor is configured to:
compare the first distance with the second vehicle door dimension;
determine if the second vehicle door dimension is greater than the first distance; and
control an operation of a first vehicle component responsive to determining that the second vehicle door dimension is greater than the first distance.

2. The first vehicle of claim 1, wherein the transceiver receives the second vehicle door dimension from the second vehicle.

3. The first vehicle of claim 1, wherein the second vehicle is located at a right side of the first vehicle.

4. The first vehicle of claim 3, wherein the first vehicle component is a first vehicle right running board configured to move between a retracted position and an extended position.

5. The first vehicle of claim 4, wherein the first vehicle right running board extends away from a first vehicle right side body shielding first vehicle right side doors or first vehicle right side mirrors when the first vehicle right running board is in the extended position, and wherein the first vehicle right running board does not extend away from the first vehicle right side body when the first vehicle right running board is in the retracted position.

6. The first vehicle of claim 4, wherein the processor controls the operation of the first vehicle right running board by causing the first vehicle right running board to move to the extended position, responsive to determining that the second vehicle door dimension is greater than the first distance.

7. The first vehicle of claim 6, wherein the detection unit is further configured to detect a second distance between the first vehicle and a third vehicle located adjacent to the first vehicle and at a left side of the first vehicle, and wherein the transceiver is further configured to receive a third vehicle door dimension.

8. The first vehicle of claim 7, wherein the processor is further configured to:

compare the second distance with the third vehicle door dimension;

determine if the third vehicle door dimension is greater than the second distance; and control an operation of a second vehicle component responsive to determining that the third vehicle door dimension is greater than the second distance.

9. The first vehicle of claim 8, wherein the second vehicle component is a first vehicle left running board configured to move between a retracted position and an extended position, and wherein the processor controls the operation of the first vehicle left running board by causing the first vehicle left running board to move to the extended position, responsive to determining that the third vehicle door dimension is greater than the second distance.

10. The first vehicle of claim 1, wherein the processor is further configured to:

compare the first distance with a first vehicle door dimension;

determine if the first vehicle door dimension is greater than the first distance; and transmit an alert notification to at least one of a first vehicle Human-Machine Interface (HMI), a user device or the second vehicle, responsive to determining that the first vehicle door dimension is greater than the first distance.

11. The first vehicle of claim 1, wherein the processor is further configured to:

determine a first vehicle height and a second vehicle height;

determine if the first vehicle height is less than the second vehicle height; and control a first vehicle suspension operation to increase the first vehicle height to be equivalent to the second vehicle height.

12. The first vehicle of claim 11, wherein the transceiver is further configured to receive the second vehicle height from the second vehicle, and wherein the processor is further configured to obtain the second vehicle height from the transceiver.

13. The first vehicle of claim 11, wherein the processor is further configured to:

determine that the first vehicle height is not configured to be equivalent to the second vehicle height; and transmit a height adjustment notification to the second vehicle to lower the second vehicle height to be equivalent to the first vehicle height.

14. The first vehicle of claim 11, wherein the processor is further configured to:

determine that a second vehicle door is opening based on inputs obtained from the detection unit or the second vehicle; and control the first vehicle suspension operation to increase the first vehicle height to be greater than the second vehicle height, responsive to determining that the second vehicle door is opening.

15. The first vehicle of claim 11, wherein the processor is further configured to:

determine that a first vehicle door is opening; and transmit a height increase notification to the second vehicle to increase the second vehicle height to be greater than the first vehicle height, responsive to determining that the first vehicle door is opening.

16. A method for preventing door ding in a first vehicle, the method comprising:

comparing, by a processor, a distance between the first vehicle and a second vehicle located adjacent to the first vehicle with a second vehicle door dimension;

determining, by the processor, if the second vehicle door dimension is greater than the distance; and controlling, by the processor, an operation of a first vehicle component responsive to determining that the second vehicle door dimension is greater than the distance.

17. The method of claim 16, wherein the first vehicle component is a first vehicle running board configured to move between a retracted position and an extended position.

18. The method of claim 17, wherein the first vehicle running board extends away from a first vehicle side body shielding first vehicle side doors or first vehicle side mirrors when the first vehicle running board is in the extended position, and wherein the first vehicle running board does not extend away from the first vehicle side body when the first vehicle running board is in the retracted position.

19. The method of claim 17, wherein controlling the operation of the first vehicle running board comprises causing the first vehicle running board to move to the extended position, responsive to determining that the second vehicle door dimension is greater than the distance.

20. A non-transitory computer-readable storage medium having instructions stored thereupon which, when executed by a processor, cause the processor to:

compare a distance between a first vehicle and a second vehicle located adjacent to the first vehicle with a second vehicle door dimension;

determine if the second vehicle door dimension is greater than the distance; and control an operation of a first vehicle component responsive to determining that the second vehicle door dimension is greater than the distance.

* * * * *